3,527,737
ADHESIVE COMPOSITIONS
Eiichi Masuhara, Kuniharu Kojima, and Niro Tarumi, Tokyo, and Hiroko Hotta, Fujisawa, Japan, assignors to G-C Kagaku Kogyo Kabushiki-Kaisha, Tokyo, Japan
No Drawing. Filed Sept. 15, 1967, Ser. No. 668,179
Int. Cl. C08f 15/16
U.S. Cl. 260—78.5     8 Claims

ABSTRACT OF THE DISCLOSURE

This invention relates to a new adhesive composition comprising an alkyl methacrylate having an alkyl group containing 1 to 4 carbon atoms and an ester of methacrylic acid having the general Formula I:

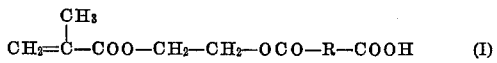

$$CH_2=C(CH_3)-COO-CH_2-CH_2-OCO-R-COOH \quad (I)$$

wherein R represents an aryl, alkyl or hydroxyalkyl group with or without addition of an ester of dimethacrylic acid having the general Formula II:

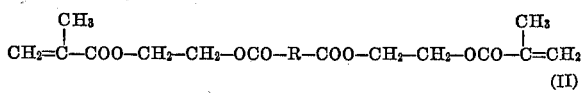

$$CH_2=C(CH_3)-COO-CH_2-CH_2-OCO-R-COO-CH_2-CH_2-OCO-C(CH_3)=CH_2 \quad (II)$$

Also, this invention relates to such new adhesive compositions as above which still further contain an effective amount of an organometallic compound such as tri-n-butyl borane or a tertiary amine.

---

This invention relates to new adhesive compositions consisting of new methacrylic esters and organometallic compounds useful for adhering acrylic resins to teeth or articles shaped from ivory or metal alloys.

Heretofore, there have ben used in the art some arcylic resins, which are curable at ordinary temperature, comprising as the principal component a methyl methacrylate and a benzoyl peroxide-tertiary amine catalytic system for adhering acrylic resins to teeth or articles shaped from ivory or metal alloys. However, such an acrylic resin has a defect that it does not adhere to the teeth or the articles mentioned above in the wetting state. Thus, there have not been proposed in the art adhesive materials for adhering an oleophilic resin to a hydrophilic material such as teeth, ivory or metal alloys.

It is the object of this invention to provide a new adhesive composition comprising new methacrylic esters derived from at least two monomeric compounds, which has a chemical affinity and cohesive power, for adhering the oleophilic resin to the hydrophilic materials. In order to achieve the foregoing object of this invention, there is provided an adhesive composition consisting of 80 parts to 99 parts by weight of an alkyl methacrylate having an alkyl group containing 1 to 4 carbon atoms and 1 part to 20 parts of an ester of a methacrylic acid having the general Formula I which is newly synthesized by the inventors:

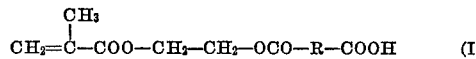

$$CH_2=C(CH_3)-COO-CH_2-CH_2-OCO-R-COOH \quad (I)$$

with or without addition of a two-functional methacrylic derivatives having the general Formula II

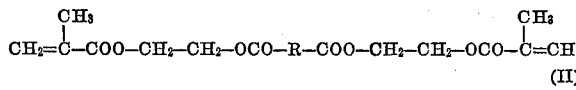

$$CH_2=C(CH_3)-COO-CH_2-CH_2-OCO-R-COO-CH_2-CH_2-OCO-C(CH_3)=CH_2 \quad (II)$$

In the Formulae I and II, R represents an alkyl, aryl or hydroxyalkyl group.

The adhesive composition is prepared, for example, by the following procedure. At the first, 1 part to 20 parts by weight of the ester of the methacrylic acid as shown by the Formula I is dissolved in 99 parts to 80 parts of the alkyl methacrylate having an alkyl group containing 1 to 4 carbon atoms and then the resultant is mixed with an organometallic compound such as trialkyl borane or a tertiary amine in amount of 1 part to 5 parts by weight to produce a solution. This solution is referred to as "Solution A."

At the second, 100 parts of a polymerized methylmethacrylate powder were mixed with or without 1 part to 10 parts benzoyl peroxide which is referred to as "Powder B." One part of the solution A is mixed with 2 parts of the powder B and the resultant mixture thus produced is used as the adhesive composition in the sticky state.

The ivory or the metal alloy is coated with the sticky adhesive composition, and then is jointed to the preformed methacrylic resin under the pressure of 1 kg./cm.$^2$ for about 30 minutes. It is noted that the adhesive composition prepared in accordance with this invention can be cured on the surface of the coated ivory or the coated metal alloy by the co-polymerization reaction between the components contained in the adhesive composition. Thus, the adhesive composition of this invention is effectively used for adhering the methacrylic resin to the teeth or articles shaped from the ivory and metal alloys under surroundings in which the heat-treatment must be eliminated.

In addition, it is noted that the methacrylic esters as shown by the Formula I forms the wetted surface on the polar material such as ivory and hence the adhesive composition of this invention can be applied to such preformed materials to form a uniform and smooth coating on the surface thereof.

Further, it is preferable to mix the adhesive composion consisting of the methacrylic ester having an alkyl group containing 1 to 4 carbon atoms and the ester as shown by the Formula I with the two functional methacrylic derivative as shown by the Formula II or a dimethacrylic ester having an alkylene group containing 2 or more carbon atoms in a small amount, and preferably in an amount of 1 part to 10 parts by weight of the adhesive composition to produce a copolymerizable mixture because such a two functional methacrylic derivative is copolymerized with the co-existent components contained in the adhesive composition and give a rigidity to the adhesive layer of the composition after it was cured.

The adhesive compositions as mentioned above can easily be applied to thermal plastic resins, ivory or the natural teeth and also such an adhesive composition displays a special effect when the adhesive layer is required to be water-resistant.

The curing time of the adhesive composition after it was applied to the substrate is varied from 10 to 30 minutes depending on a temperature and the humidity of the ambient atmosphere, and the amount of the tertiary amines or the organometallic compounds used as the curing agent. And it is measured that the adhesive strength is 30 to 120 kg./cm.$^2$ after the adhesive composition was cured under the pressure of 1 kg./cm.$^2$ for one hour and then the cured products were dipped into water at 37° C. for 24 hours. This proves that the adhesive compositions of this invention are used for the prolonged period of time in water for producing the excellent adhesive strength as compared with the conventional adhesive materials.

This invention is illustrated by the following examples.

EXAMPLE 1

Thirty-two parts by weight of 2-hydroxyethyl methacrylate were reacted with 37 parts by weight of phthalic anhydride in the presence of 300 parts by weight of benzene and 1 part by weight of sulfuric acid for five hours under refluxing and the reaction product was washed with 50 parts by weight of a dilute sodium carbonate aqueous solution and then with 100 parts by weight of water for three times for removing the sulfuric acid and then the resultant product was dried with the silica gel. The product was evaporated under reduced pressure for removing the benzene and the residual product was subjected to distillation thereby to produce a distillate having boiling point of 105–106° C. at 4 mm. Hg and refractive index ($n_D{}^{20}$) of 1.4561. This distillate was analyzed by using the infrared spectrometer and recognized to be methacryloxyethyl phthalate.

The methacryloxyethyl phthalate was coated on the surface of ivory. On the other hand, 10 parts by weight of the methacryloxyethyl phthalate was mixed with 90 parts by weight of a methyl methacrylate and 1 part by weight of dimethyl-p-toluidine to produce a solution which is referred to "Solution A." One part of the "Solution A" was mixed with two parts of "Powder B" which is consisted of the polymerized methyl-methacrylate powder as mentioned above.

The resultant product was used as the adhesive composition.

At first, an ivory rod having a rectangular section of 10 mm. thickness, 10 mm. width and 100 mm. length was coated with the methacryloxyethyl phthalate and then the coated ivory rod was coated with the adhesive composition as mentioned above. The coated ivory rod was bonded to an acrylic resin rod having the same size as that of the ivory rod under the pressure of 1 kg./cm.$^2$ for one hour. The bonded article thus obtained was placed in water at 73° C. for overnight and then determined tensile strength at the speed of 2 mm. per inch by using a "Instron" type tester. It was found that the bonded article have tensile strength of 15 to 35 kg./cm.$^2$. This is comparable with tensile strength of 0 to 5 kg./cm.$^2$ giving by a bonded article which was prepared by using the conventional acrylic adhesive under the same conditions as mentioned above.

EXAMPLE 2

Ten parts by weight of the methacryloxyethyl phthalate was mixed with 90 parts by weight of a methylmethacrylate. One part of the resultant mixture was mixed with 0.05 part of tri-n-butyl borane to produce a solution which is referred to "Solution A." One part of the "Solution A" was blended with one part of "Powder B" which is the same as the "Powder B" used in Example 1. The resultant product was used as the adhesive composition. A bonded article was prepared in the same manner as in Example 1 and the bonded article was tested for tensile strength in the same manner as in Example 1 and measured tensile strength of 45 to 120 kg./cm.$^2$ under the wet state.

Further, a dental alloy was coated with the above adhesive composition and the coated dental alloy was bonded to the rod made of the acrylic resin. The bonded article was tested for tensile strength under the wet state in the same manner as in Example 1 and measured that tensile strength is 23 to 26 kg./cm.$^2$. This is comparable with tensile strength of 0 to 7 kg./cm.$^2$ giving by a bonded article which was prepared by using the conventional acrylic adhesive under the same conditions as mentioned above.

EXAMPLE 3

Twenty three parts by weight of oxalic acid and 32 parts by weight of 2-hydroxyethyl methacrylate were dissolved in 200 parts by weight of benzene and then 0.5 part by weight of sulfuric acid was added thereto. The resultant mixture was reacted under heating for 10 hours or more. The reaction product was washed with 50 parts by weight of a dilute sodium carbonate aqueous solution at once and then with 50 parts by weight of water for three times for removing the sulfuric acid and the resultant product was dried with silica gel. The product was distillated under reduced pressure to produce a distillate having boiling point of 110 to 120° C. at 20 mm. Hg. The distillate was re-distilled under reduced pressure to produce a distillate having boiling point of 83 to 85° C. at 4 mm. Hg and refractive index ($n_D{}^{20}$) of 1.4472. This distillate was analyzed by using the infrared spectrometer and recognized to be methacryloxyethyl oxalate.

According to the same procedure as in Example 2, an adhesive composition was prepared by using methylmethacrylate, methacryloxyethyl oxalate and "Powder B."

An ivory rod was coated with the methacryloxyethyl oxalate and then the coated ivory rod was coated with the adhesive composition. The coated ivory rod was bonded to a methacrylic resin rod by compressing under pressure of 1 kg./cm.$^2$ for one hour. The bonded article thus obtained was placed in water at 37° C. for overnight and then it was determined the tensile strength in the same manner as in Example 2 and measured tensile strength of 50 to 75 kg./cm.$^2$

EXAMPLE 4

Thirty two parts by weight of a 2-hydroxyethyl methacrylate, 26 parts by weight of malonic anhydride and a small amount of hydroquinone were dissolved in 250 parts by weight of benzene and then 0.5 part by weight of sulfuric acid was added thereto. The resultant mixture was reacted under refluxing for several hours. The reaction product was washed with 50 parts by weight of a dilute sodium carbonate aqueous solution at once and then with 50 parts by weight of water for three times for removing the sulfuric acid and the resultant product was dried with silica gel. The product was distillated under reduced pressure to produce a distillate having boiling point of 120° to 130° C. at 20 mm. Hg. The product was re-distillated under reduced pressure to produce the distillate having boiling point of 105° C. at 10 mm. Hg and refractive index ($n_D{}^{20}$) of 1.4435. This distillate was analyzed by using the infrared spectrometer and recognized to be a mixture of bis-methacryloxyethyl malonate and teromers thereof.

Accordingly to the same procedure as in Example 2, an adhesive composition was prepared by using a methyl methacrylate, the mixture of bis-methacryloxymethyl malonate and its teromer, together with the "Powder B."

An ivory rectangular rod was coated with the mixture of bis-methacryloxyethyl malonate and its teromer and then the coated ivory was bonded to an acrylic resin having the rectangular section under the pressure of 1 kg./cm.$^2$ for one hour by using the above adhesive composition. The bonded article thus obtained was placed in water at 37° C. for overnight and then it was determined tensile strength in the same manner as in Example 2 and measured tensile strength of 30 to 80 kg./cm.$^2$.

EXAMPLE 5

Thirty-two parts by weight of 2-hydroxyethyl methacrylate, 25 parts by weight of succinic anhydride and a small amount of hydroquinone were dissolved in 250 parts by weight of dry benzene and then 0.5 part by weight of sulfuric acid was added thereto. The resultant mixture was reacted under refluxing for several hours. The reaction product was washed with 50 parts by weight of a dilute sodium carbonate aqueous solution at once and then with 50 parts by weight of water for three times and then the product was dried with silica gel. The product was distilled under reduced pressure to form a pale yellowish brown liquid. This liquid was analyzed by using the infrared spectrometer and recognized to be a mixture of methacryloxyethyl succinate, bis-methacryloxyethyl succinate and teromers thereof.

In ivory rectangular rod was coated with the liquid product as mentioned above and then the coated ivory was bonded to an acrylic resin rectangular rod by using an adhesive composition, which was prepared by using methyl methacrylate, methacryloxyethyl succinate, bis-methacryloxyethyl succinate and a powder of polymerized methyl-methacrylate under presusre of 1 kg./cm.² for one hour. The bonded article thus obtained was placed in water at 37° C. for overnight and then it was determined tensile strength in the same manner as in Example 2 and measured tensile strength of 55 to 70 kg./cm.².

EXAMPLE 6

Twenty-six parts by weight of 2-hydroxyethyl methacrylate, 30 parts by weight of tartaric acid and a small amount of hydroquinone were dissolved in 300 parts by weight of dry benzene and then 0.5 part by weight of sulfuric acid was added thereto. The resultant mixture was reacted under refluxing for 10 hours. The reaction product was washed with 50 parts by weight of a dilute sodium carbonate aqueous solution at once and then with 50 parts by weight of water for three times and then the product was dried with silica gel. The product was then distilled under reduced pressure to form a yellowish brown viscous liquid.

An ivory rectangular rod was coated with the viscous liquid product as mentioned above and then the coated ivory was bonded to an acrylic resin rectangular rod by using an adhesive composition, which was prepared by using methyl-methacrylate, methacryloxyethyl tartrate and a powder of polymerized methyl-methacrylate under pressure of 1 kg./cm.² for one hour. The bonded article thus obtained was placed in water at 37° C. and then it was determined tensile strength and measured tensile strength of 65 to 85 kg./cm.².

What we claim is:

1. An adhesive composition consisting essentially of polymethylmethacrylate powder and in admixture therewith a liquid adhesive component consisting of 80 parts to 99 parts by weight of alkyl methacrylate having an alkyl group containing 1 to 4 carbon atoms and 1 part to 20 parts by weight of methacryloxyethyl oxalate or an ester of methacrylic acid having the general Formula I:

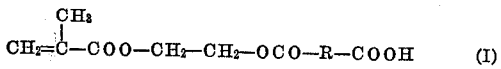

wherein R represents a phenyl or an alkyl group having 1 to 3 carbon atoms.

2. An adhesive composition consisting essentially of a polymethylmethacrylate powder and in admixture therewith a liquid adhesive component consisting of 80 parts to 99 parts by weight of alkyl methacrylate having an alkyl group containing 1 to 4 carbon atoms, 1 part to 20 parts by weight of methacryloxyethyl oxalate or an ester of methacrylic acid having the general Formula I:

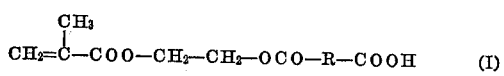

wherein R represents a phenyl or an alkyl group having 1 to 3 carbon atoms, and 1 part to 10 parts by weight of an ester of di-methacrylic acid having the general Formula II:

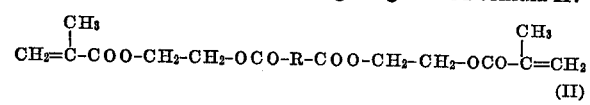

wherein R represents a phenyl or an alkyl group having 1 to 3 carbon atoms.

3. An adhesive composition consisting essentially of a polymethacrylate powder and in admixture therewith a liquid adhesive component consisting of 80 parts to 99 parts by weight of alkyl methacrylate having an alkyl group containing 1 to 4 carbon atoms, 1 part to 20 parts by weight of methacryloxyethyl oxalate or an ester of methacrylic acid having the general Formula I:

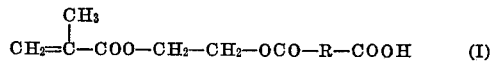

wherein R represents a phenyl or an alkyl group having 1 to 3 carbon atoms, and 1 part to 5 parts by weight of tri-n-butyl borane.

4. An adhesive composition consisting essentially of a polymethylmethacrylate powder and in admixture therewith a liquid adhesive component consisting of 80 parts to 99 parts by weight of alkyl methacrylate having an alkyl group containing 1 to 4 carbon atoms, 1 part to 20 parts by weight of methacryloxyethyl oxalate or an ester of methacrylic acid having the general Formula I:

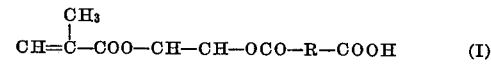

wherein R represents a phenyl or an alkyl group having 1 to 3 carbon atoms, and 1 part to 5 parts by weight of dimethyl-p-toluidine.

5. An adhesive composition consisting essentially of a polymethylmethacrylate powder and in admixture therewith a liquid adhesive component consisting of 80 parts to 99 parts by weight of alkyl methacrylate having an alkyl group containing 1 to 4 carbon atoms, 1 part to 20 parts by weight of methacryloxyethyl oxalate or an ester of methacrylic acid having the general Formula I:

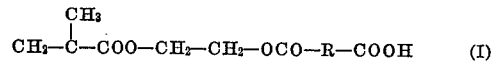

wherein R represents a phenyl or an alkyl group having 1 to 3 carbon atoms, 1 part to 10 parts by weight of an ester of di-methacrylic acid having the general Formula II:

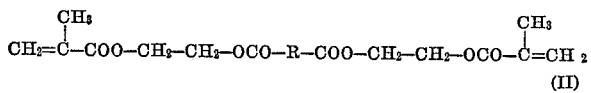

wherein R represents a phenyl or an alkyl group having 1 to 3 carbon atoms, and 1 part to 5 parts by weight of tri-n-butyl borane.

6. An adhesive composition consisting essentially of a polymethylmethacrylate powder and in admixture therewith a liquid adhesive component consisting of 80 parts to 99 parts by weight of alkyl methacrylate having an alkyl group containing 1 to 4 carbon atoms, 1 part to 20 parts by weight of methacryloxyethyl oxalate or an ester of methacrylic acid having the general Formula I:

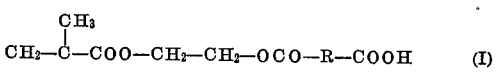

wherein R represents a phenyl or an alkyl group having 1 to 3 carbon atoms, 1 part to 10 parts by weight of an ester of di-methacrylic acid having the general Formula II:

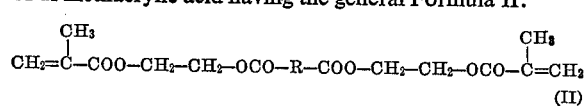

wherein R represents a phenyl or an alkyl group having 1 to 3 carbon atoms, and 1 part to 5 parts by weight of dimethyl-p-toluidine.

7. A composition according to claim 1 in which the composition contains a major amount of the polymethylmethacrylate powder.

8. An adhesive composition consisting essentially of a major amount of powder and in admixture therewith a liquid adhesive component consisting essentially of 80 parts to 99 parts by weight of a monomeric alkyl methacrylate having an alkyl group containing 1 to 4 carbon atoms, 1 part to 20 parts by weight of a comonomer selected from the group consisting of methacryloxyethyl phthalate, methacryloxyethyl oxalate, methacryloxyethyl malonate, methacryloxyethyl succinate and methacryloxyethyl tartarate, and 1 part to 5 parts by weight of tri-n-butyl borane.

References Cited

UNITED STATES PATENTS

| | | | |
|---|---|---|---|
| 3,234,169 | 2/1966 | Taub | 260—885 XR |
| 3,336,418 | 8/1967 | Dill | 260—885 XR |
| 2,916,469 | 12/1959 | Lai | 260—78.5 XR |
| 3,317,493 | 5/1967 | Selby. | |

FOREIGN PATENTS 1,037,904  8/1966  Great Britain.

JOSEPH L. SCHOFER, Primary Examiner

J. KIGHT III, Assistant Examiner

U.S. Cl. X.R.

117—132, 138.8, 161; 260—41, 86.1